United States Patent
Seagle et al.

(10) Patent No.: US 7,307,814 B1
(45) Date of Patent: Dec. 11, 2007

(54) PEDESTAL DEFINED ZERO THROAT WRITER HAVING A RECESSED PEDESTAL

(75) Inventors: David J. Seagle, Morgan Hill, CA (US); Qing (Leslie) He, Fremont, CA (US); G. Vinson Kelley, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 987 days.

(21) Appl. No.: 10/087,505

(22) Filed: Mar. 1, 2002

(51) Int. Cl.
*G11B 5/147* (2006.01)
(52) U.S. Cl. .................................................... 360/126
(58) Field of Classification Search ................. 360/126
See application file for complete search history.

(56) References Cited

U.S. PATENT DOCUMENTS

| | | | |
|---|---|---|---|
| 6,459,543 B1 * | 10/2002 | Sasaki | 360/126 |
| 6,490,127 B1 * | 12/2002 | Sasaki | 360/126 |
| 6,624,971 B1 * | 9/2003 | Sasaki | 360/126 |

* cited by examiner

*Primary Examiner*—David Davis
(74) *Attorney, Agent, or Firm*—Strategic Patent Group

(57) ABSTRACT

A method and system for providing a pedestal defined zero throat write head is disclosed. The method and system include providing a first pole having a pedestal, providing a gap and providing a second pole. The first pole has a pedestal. The gap separates the pedestal of the first pole from a portion of the second pole. The pedestal has a front, a back, a top and a bottom. The back of the pedestal has a recess therein, which runs from the top of the pedestal to the bottom of the pedestal.

11 Claims, 4 Drawing Sheets

PEDESTAL DEFINED ZERO THROAT WRITER HAVING A RECESSED PEDESTAL

FIELD OF THE INVENTION

The present invention relates to magnetic memory systems, and more particularly to a method and system for providing a writer having a shaped pedestal.

BACKGROUND OF THE INVENTION

In order to write data to media, a write head is typically used. Such a write head is generally part of a merged head that includes a head for writing and a head for reading data from the media. FIGS. 1A and 1B depict side and top views, respectively, of a portion of a conventional pedestal-defined zero throat (PDZT) head 10. The conventional PDZT head 10 includes a conventional first pole (P1) 12 having a conventional pedestal 14, a conventional coil 20, a conventional second pole (P2) 30 and a conventional gap 40 separating the conventional P1 12 from the conventional P2 30. The conventional PDZT head 10 also includes an insulating layer 22 used to insulate coils 20. The insulating layer 22 is typically a hardbaked photoresist layer.

Although the conventional PDZT head 10 functions, one of ordinary skill in the art will readily recognize that the conventional PDZT head 10 has several drawbacks. The zero throat position 50 is the point at which the conventional P1 12 and the conventional P2 30 diverge away from the write gap 40. Thus, the zero throat position 50 is defined by the position that the pedestal 12 diverges from the P1. The conventional pedestal 14 and, therefore, the distance of the zero throat position 50 from the air-bearing surface (throat height) are relatively large. As a result, more magnetic flux is carried throughout the conventional pedestal 14. More flux is thus situated away from the air-bearing surface at the front of the conventional pedestal 14. It is thus more difficult for the conventional PDZT head 10 to write to a recording media (not shown). In addition, because more flux is required to be carried throughout the conventional pedestal 14, the conventional PDZT head 10 has a higher inductance. Consequently, the rise time for current in the coil 20 is lower. Moreover, because of the high flux through the P1 10, the bottom of the pedestal 12 may become saturated, causing the conventional PDZT head 10 to inadvertently erase tracks adjacent to the track currently being written. For these reasons, performance of the conventional PDZT head 10 suffers.

Accordingly, what is needed is a system and method for improving the performance of a PDZT head. The present invention addresses such a need.

SUMMARY OF THE INVENTION

The present invention provides a method and system for providing a pedestal defined zero throat write head. The method and system comprise providing a first pole having a pedestal, providing a gap and providing a second pole. The first pole has a pedestal. The gap separates the pedestal of the first pole from a portion of the second pole. The pedestal has a front, a back, a top and a bottom. The back of the pedestal has a recess therein, which runs from the top of the pedestal to the bottom of the pedestal.

According to the system and method disclosed herein, the present invention provides a pedestal defined zero throat head having improved performance.

DETAILED DESCRIPTION OF THE INVENTION

The present invention relates to an improvement in write heads. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention provides a method and system for providing a pedestal defined zero throat write head. The method and system comprise providing a first pole having a pedestal, providing a gap and providing a second pole. The first pole has a pedestal. The gap separates the pedestal of the first pole from a portion of the second pole. The pedestal has a front, a back, a top and a bottom. The back of the pedestal has a recess therein, which runs from the top of the pedestal to the bottom of the pedestal.

The present invention will be described in terms of a particular PDZT write head. However, one of ordinary skill in the art will readily recognize that this method and system will operate effectively for other PDZT heads having portions of other sizes that are consistent with the present invention. The present invention will also be described in the context of a portion of a PDZT write head. However, one of ordinary skill in the art will readily recognize that the PDZT head is generally part of a merged head including both a write head and a read head. The present invention will also be described as a method having particular steps. One of ordinary skill in the art will recognize, however, that for clarity, some steps have been omitted. The PDZT head in accordance with the present invention is also described as having components above or below other components. One of ordinary skill in the art will readily recognize that this description is made in the context of a side view of the PDZT head as fabricated, with the substrate below the PDZT head, for example as shown in FIGS. 2A and 3A.

Figure 1A:
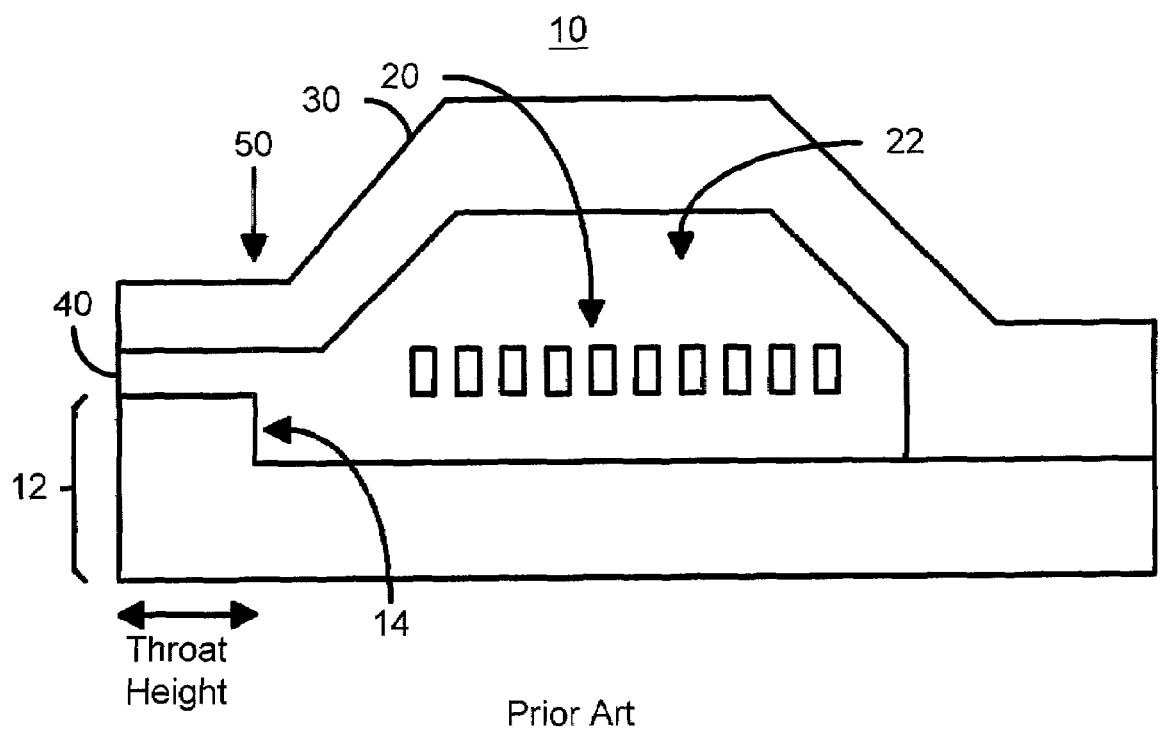
FIG. 1A is a side view of a portion of a conventional PDZT head.
Figure 1B:
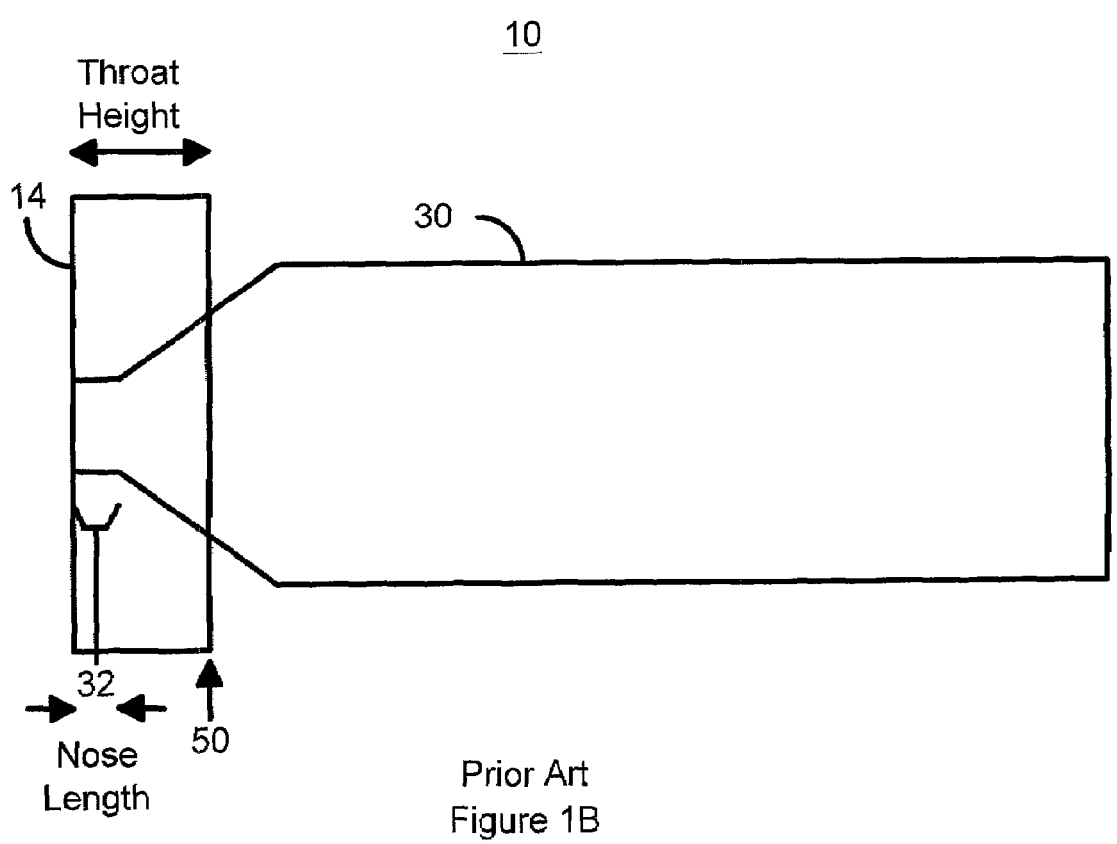
FIG. 1B is a top view of a portion of a conventional PDZT head.
Figure 2A:
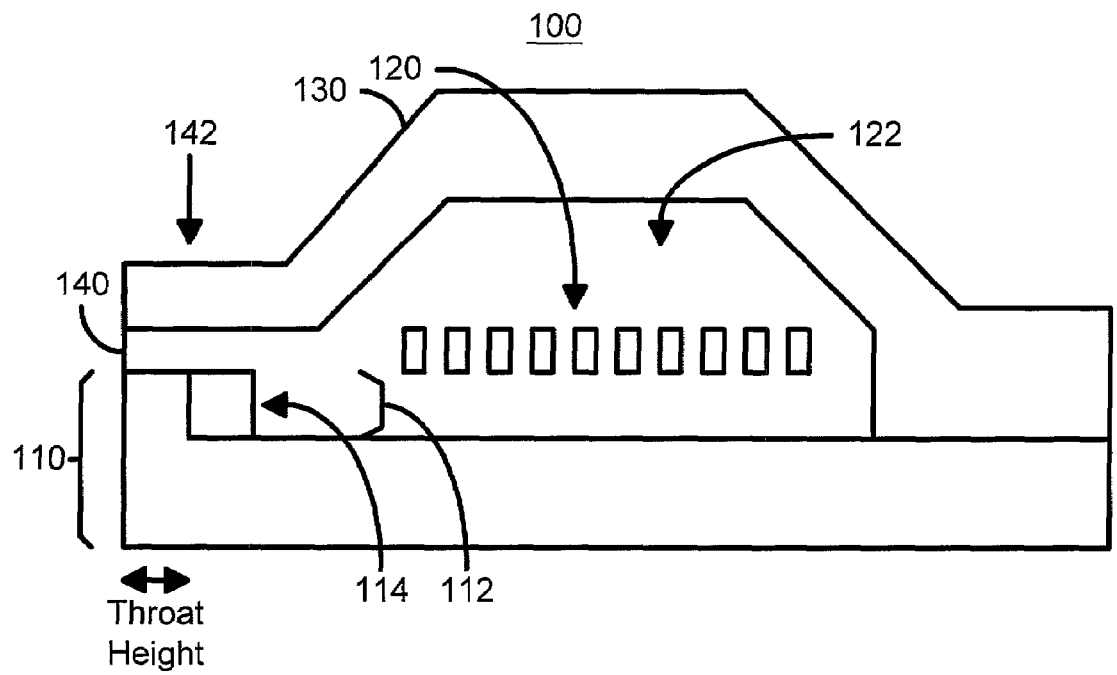
FIG. 2A is a side view of a portion of one embodiment of a PDZT head in accordance with the present invention.
Figure 2B:
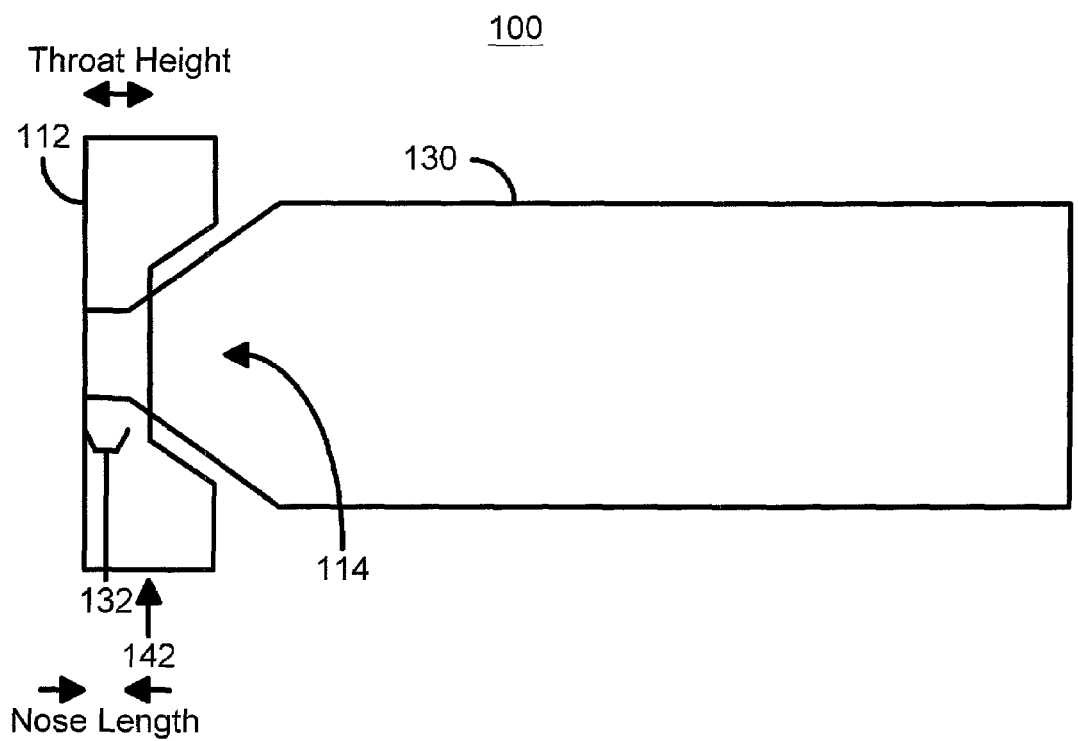
FIG. 2B is a top view of a portion of one embodiment of a PDZT head in accordance with the present invention
Figure 3A:
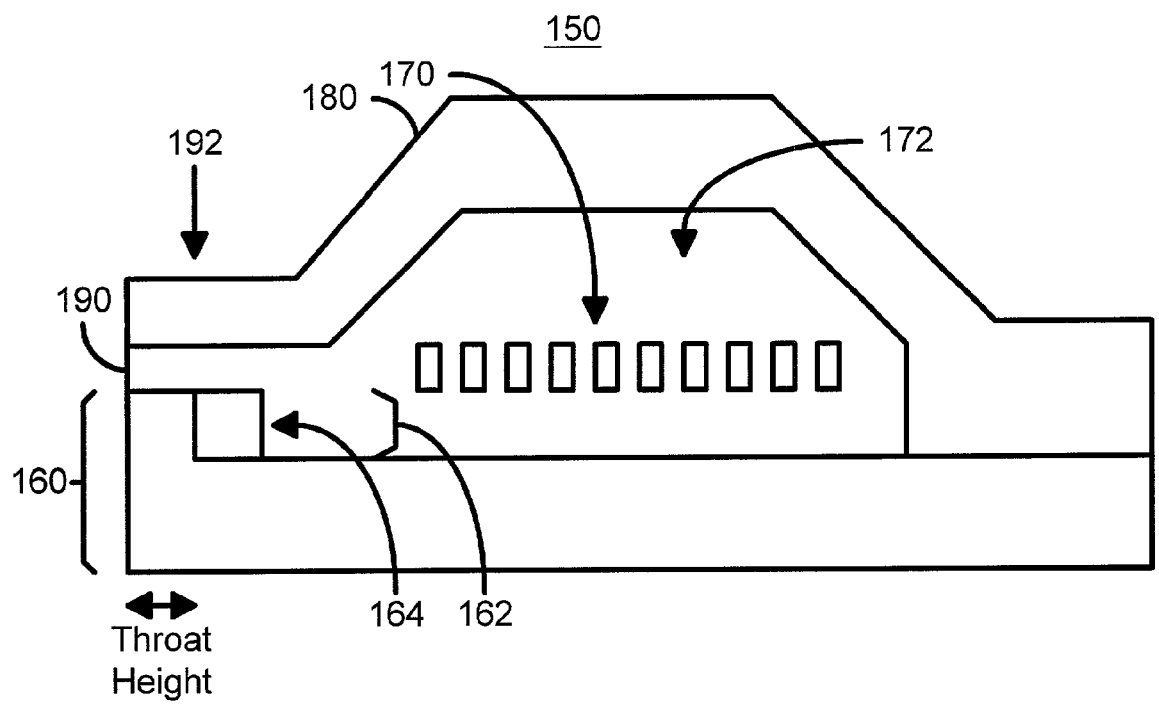
FIG. 3A is a side view of a portion of a second embodiment of a PDZT head in accordance with the present invention.

To more particularly illustrate the method and system in accordance with the present invention, refer now to FIGS. 2A and 2B, depicting side and top views, respectively, of one embodiment of a PDZT head 100 in accordance with the present invention. The PDZT head 100 includes a first pole (P1) 110, a coil 120, a second pole (P2) 130 and a write gap 140. The P1 110 includes a pedestal 112. The write gap 140 separates the pedestal 112 from the portion of the P2 130 that is directly above the pedestal 112. The P2 130 has a nose 132 formed above the write gap 140. The turns of the coils 120 are insulated from each other and from the P1 110 and P2 130 by insulator 122. The insulator 122 is generally a hardbaked photoresist layer.

The pedestal 112 has a recess 114 at its back that preferably runs the entire height of the pedestal 112. In a preferred embodiment, the recess 114 of the pedestal 112 is centered around the nose 132. Also in a preferred embodiment, the recess 114 is v-shaped. In the PDZT head 100, the edges of the recess 114 are outside of the P2 130. In addition, because the recess 114 runs from the top of the pedestal 112 to the bottom of the pedestal 112, the zero throat position 142 of the PDZT head 100 is at the bottom of the recess 114. In other words, the zero throat position 142 of the PDZT head 100 occurs where the pedestal 112 is thinner. The pedestal 112 is thus thinner in the region of the write gap 140 and the throat height is reduced.

Because of the presence of the recess 114, the PDZT head 100 has improved performance. The fact that the pedestal 112 is thinner near the write gap 140 allows less flux to be carried in the pedestal 112 during writing. As a result, the PDZT head 100 has a lower inductance. The rise time for the current in the coils 120 is thus lower. A greater fraction of the magnetic flux through the PDZT head 100 is carried closer to the air bearing surface at the front of the pedestal 112 because of the recess 114 and the attendant reduction of the throat height. The writeability of the PDZT head 100 is, therefore, improved. Moreover, the reduction in the flux carried by the pedestal 112 during writing reduces the possibility that the lower portion of the pedestal 112 will become saturated. Consequently, the PDZT head 100 is less apt to inadvertently erase adjacent tracks. In addition, as can be seen in FIG. 2B, the recess 114 extends farther than the P2 130. In other words, the edges of the recess 114 lie outside of the P2 130. As a result, the poles P1 110 and P2 130 are less likely to short. The process that trims the P1 110 and P2 130 is made more robust. Consequently, performance of the PDZT head 100 is improved and fabrication of the PDZT head 100 simplified.

Figure 3B:
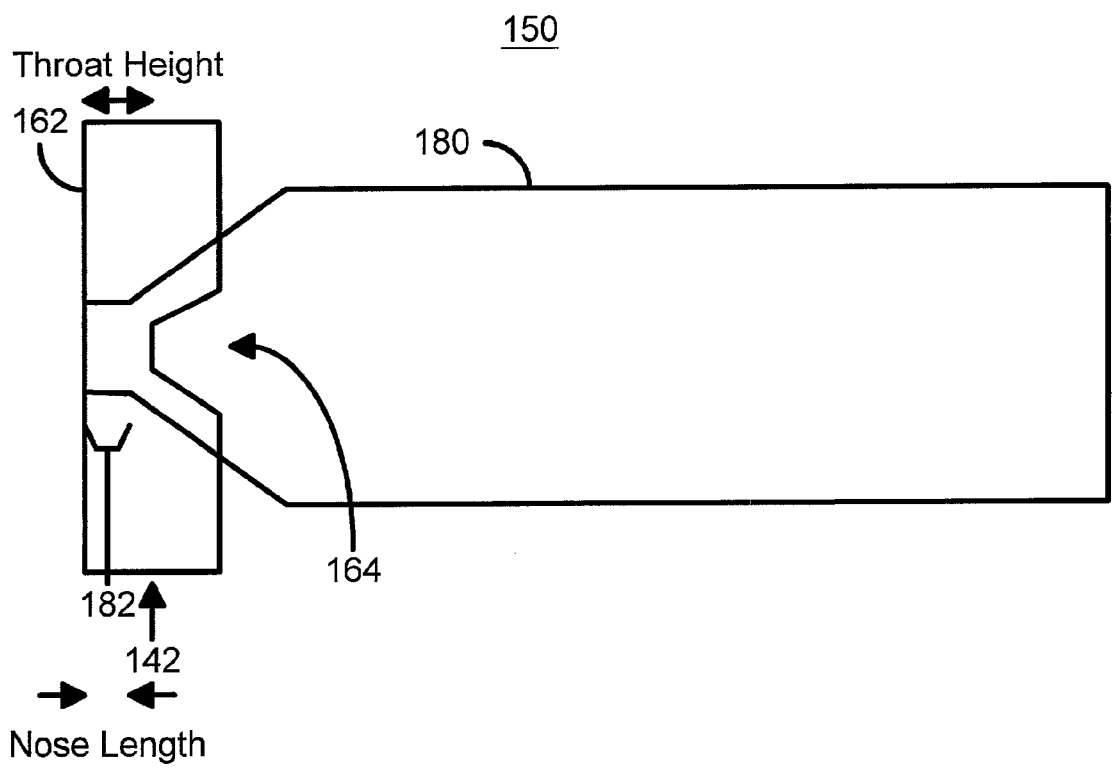
FIG. 3B is a top view of a portion of a second embodiment of a PDZT head in accordance with the present invention

FIGS. 3A and 3B depict side and top views, respectively, of a portion of a second embodiment of a PDZT head 150 in accordance with the present invention. The PDZT head 150 includes a first pole (P1) 160, a coil 170, a second pole (P2) 180 and a write gap 190. The P1 160 includes a pedestal 162. The write gap 190 separates the pedestal 162 from the portion of the P2 180 that is directly above the pedestal 162. The P2 180 has a nose 182 formed above the write gap 190. The turns of the coils 170 are insulated from each other and from the P1 160 and P2 180 by insulator 172. The insulator 172 is generally a hardbaked photoresist layer. The pedestal 162 has a recess 164 at its back that preferably runs the entire height of the pedestal 162. In a preferred embodiment, the recess 164 of the pedestal 162 is centered around the nose 182. Also in a preferred embodiment, the recess 164 is v-shaped. In the PDZT head 150, the edges of the recess 164 are inside of the P2 180. In addition, because the recess 164 runs from the top of the pedestal 162 to the bottom of the pedestal 162, the zero throat position 192 of the PDZT head 150 is at the bottom of the recess 164. In other words, the zero throat position 192 of the PDZT head 150 occurs where the pedestal 162 is thinner. The pedestal 162 is thus thinner in the region of the write gap 190 and the throat height is reduced.

Because of the presence of the recess 164, the PDZT head 150 has improved performance. The fact that the pedestal 162 is thinner near the write gap 190 allows less flux to be carried in the pedestal 162 during writing. As a result, the PDZT head 150 has a lower inductance. The rise time for the current in the coils 170 is thus lower. A greater fraction of the magnetic flux through the PDZT head 150 is carried closer to the air bearing surface at the front of the pedestal 162 because of the recess 164 and the attendant reduction of the throat height. The writeability of the PDZT head 150 is, therefore, improved. Moreover, the reduction in the flux carried by the pedestal 162 during writing reduces the possibility that the lower portion of the pedestal 162 will become saturated. Consequently, the PDZT head 150 is less apt to inadvertently erase adjacent tracks.

Figure 4:
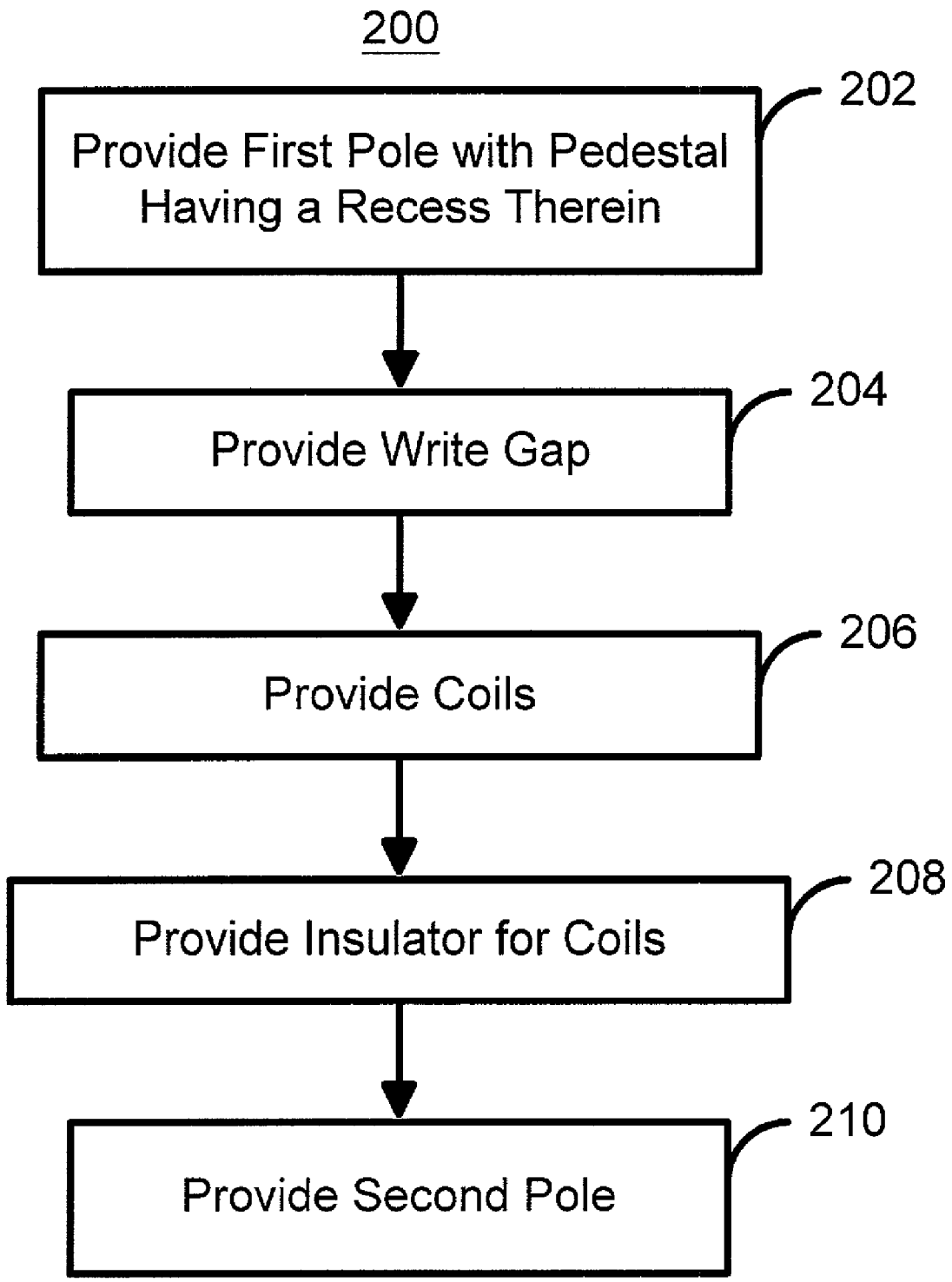
FIG. 4 is a high-level flow chart depicting one embodiment of a method for as providing a PDZT head in accordance with the present invention.

FIG. 4 is a high-level flow chart depicting one embodiment of a method 200 for providing a PDZT head 100 or 150 in accordance with the present invention. For clarity, the first pole, P1, is provided, via step 202. Step 202 preferably includes depositing the pedestal and forming the recess in the pedestal. In one embodiment, the recess can be formed by depositing the pedestal and removing a portion of pedestal. In an alternate embodiment, the pedestal may include the recess as deposited. The edges of the recess formed in step 202 could lie outside of the P2 or directly above a portion of the P2. The write gap is formed over the pedestal, via step 204. The coils are formed, via step 206. An insulator is formed on the coils, via step 208. The second pole, P2, is provided, via step 210. Thus, the PDZT head 100 and 150 may be formed.

A method and system has been disclosed for a PDZT write head having improved performance. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A pedestal defined zero throat write head comprising:
a first pole having a pedestal, the pedestal having a front, a back, a top and a bottom, the back of the pedestal having a recess therein, the recess running from the top of the pedestal to the bottom of the pedestal;
a second pole;
a gap separating the pedestal of the first pole from a portion of the second pole;
wherein the second pole has a bottom surface, a portion of the bottom surface extending over the pedestal and along the gap beyond the back of the pedestal and being substantially flat such that a zero throat height of the write head is defined by the pedestal.

2. The pedestal defined zero throat write head of claim 1 wherein the recess includes a first edge and a second edge, the first edge and the second edge being directly under a portion of the second pole.

3. The pedestal defined zero throat write head of claim 1 wherein the recess includes a first edge and a second edge, the first edge and the second edge being outside of the second pole.

4. The pedestal defined zero throat write head of claim 1 wherein the second pole further includes a nose and wherein a portion of the pedestal is directly under the nose.

5. The pedestal defined zero throat write head of claim 1 further comprising:
at least one coil between the first pole and the second pole.

6. The method of claim 1 wherein the second pole providing step (c) further includes the step of:

(c2) providing a nose such that a portion of the pedestal is directly under the nose.

7. A method for providing pedestal defined zero throat write head comprising the steps of:

(a) providing a first pole having a pedestal, the pedestal having a front, a back, a top and a bottom, the back of the pedestal having a recess therein, the recess running from the top of the pedestal to the bottom of the pedestal;

(b) providing a gap above the pedestal;

(c) providing a second pole, the gap separating the pedestal from a portion of the second pole;

wherein the second pole providing step (c) further includes the step of:

(c1) providing the second pole such that the second pole has a bottom surface, a portion of the bottom surface extending over the pedestal and along the gap beyond the back of the pedestal and being substantially flat such that a zero throat height of the write head is defined by the pedestal.

8. The method of claim 7 wherein the first pole providing step (a) further includes the steps of:

(a1) depositing the pedestal; and (a2) removing a portion of the pedestal to provide the recess.

9. The method of claim 7 wherein the first pole providing step (a) further includes the step of:

(a1) providing the recess having a first edge and a second edge such that the first edge and the second edge are directly under a portion of the second pole.

10. The method of claim 7 wherein the first pole providing step (a) further includes the step of:

(a1) providing the recess having a first edge and a second edge such that the first edge and the second edge are outside of the second pole.

11. The method of claim 7 further comprising the step of:

(d) providing at least one coil between the first pole and the second pole.

\* \* \* \* \*